June 20, 1939.  L. D. SEARCY  2,163,066
POWER TRANSMISSION
Filed June 22, 1937   2 Sheets-Sheet 2

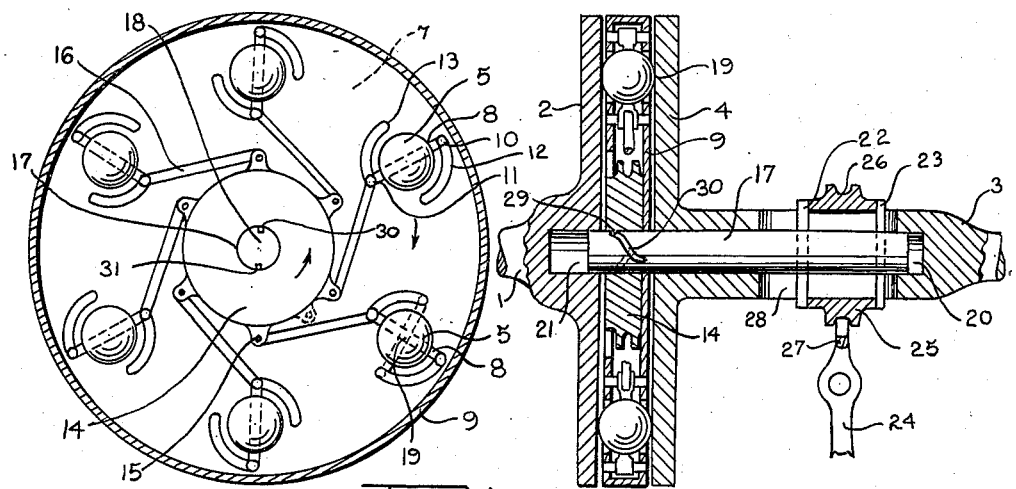
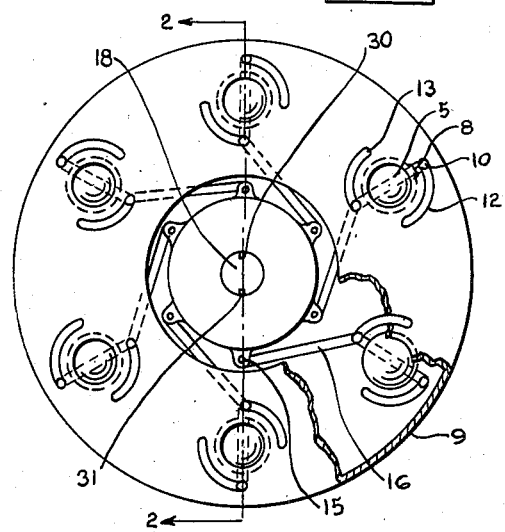
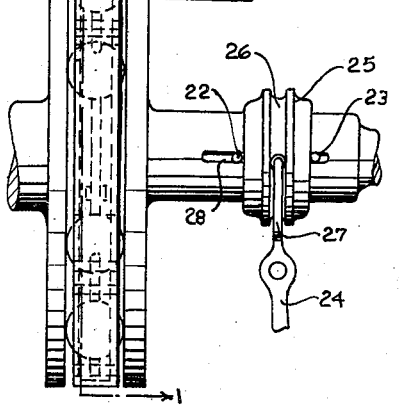
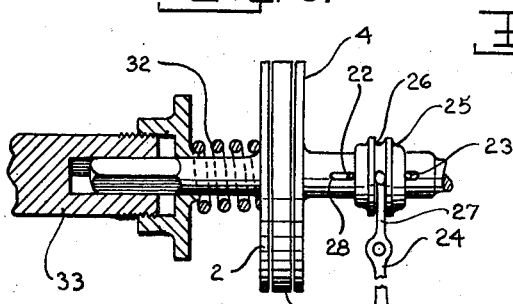

Lynn D. Searcy
INVENTOR
BY: A.B. McCall
ATTORNEYS.

Patented June 20, 1939

2,163,066

UNITED STATES PATENT OFFICE 2,163,066

POWER TRANSMISSION

Lynn D. Searcy, Detroit, Mich.

Application June 22, 1937, Serial No. 149,643

5 Claims. (Cl. 74—198)

My invention relates to transmissions and more especially to power transmissions for engines and machines wherein the power furnished by the engine may be transmitted to a vehicle or a machine adapted to be operated by an engine; an object being in my transmission to provide a novel and practical arrangement for selectively and optionally varying the amount of power transmitted as well as the speed with which such power may be carried over to the driven mechanism.

A further object of my invention is to provide a power transmission for vehicles having an engine as their source of energy and to provide in such a vehicle a simple and practical as well as economical means of transferring the power from the engines to the driven mechanism in the vehicle.

A particular purpose of my invention is to provide a power transmission for automobiles and the like wherein the transmission serves as a ready means of connecting up the engine power with the mechanism which establishes its control connection with the wheels of the automobile and particularly to provide a transmission in which an adjustably controlled group of rotary bearing members may be made by their selective control to vary the amount of friction between a driving and a driven plate or member so as to thus vary the amount of power transmitted from the driving to the driven member.

I attain the objects of my invention in the transmission described in this specification, recited in the claims and illustrated in the accompanying drawings in which like reference numbers indicate like parts in the several figures.

Referring to the figures:

Figure 1 is an end view of one of the forms of my transmission and shows an interior taken from 1—1 on Figure 4.

Figure 2 is a longitudinal section of my transmission taken from 2—2 on Figure 3.

Figure 3 is an end view of a portion of my invention with the driving plate removed and disclosing the casing holding the power transmitting bearings with a cut-away portion revealing inside details of the mounting for the bearings used for power transmission.

Figure 4 is a side view of my invention with the salient features thereof disclosed in assembled form.

Figure 5 is a detail of one of the ball bearing members used in my invention with the spindle mounting therefor shown in its pivotal connection with one of the connecting pins used for the adjustment in the direction of rotation of the series of power transmitting ball bearings used in my invention.

Figure 11 is a side view of the transmission and drive shaft with the adjustable pressure spring operatively mounted on the drive shaft.

Referring now in detail to the construction of my invention in its preferred features of novelty both as to mechanical construction and method of operation I shall point out those details of both which will be necessary to make it clear how I accomplish the purposes intended for my invention together with an explanation of certain practical adaptations thereof.

It is a well-known fact that there have been in the engineering field many attempts made to develop transmissions for motor vehicles and for engines of various kinds which will make it possible to optionally vary the amount of power and speed that may be possible when such an engine is in operation.

Many of the attempts made to develop such power transmissions have resulted in awkward and cumbersome assemblage of mechanical leverages which are impractical from an engineering point of view and are expensive and troublesome to take care of.

The more recent findings of engineers in the automotive industry for instance point the way to a need for power transmissions which will be simple to operate, substantial in construction, more fool-proof in their control and less expensive to manufacture with the outstanding conclusion that a transmission which will probably receive the hoped-for public acceptance will be required to have both an automatic and an optional manipulative means of adjustment.

In this invention I choose to provide a power transmission as an operative unit capable of being installed and operated in any one of numerous machines requiring a transmission between driving and driven mechanism and it shall therefore not be my purpose to explain any details of mechanical structure beyond the immediate scope of mechanical features incorporated in my invention.

With this purpose in view I shall now set forth, with the aid of the drawings, a description of my invention wherein a driving shaft 1 having a power plate 2 operates in conjunction with a driven shaft 3 having a power plate 4.

Figure 6:
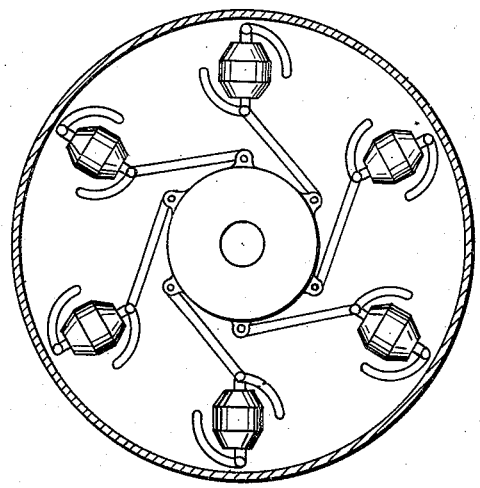
Figure 6 is an end view of my invention similar to Figure 1 but disclosing to view a roller type of bearing member within the scope of my invention which is operatively controlled in the same manner as the type of spherical ball bearing shown in Figure 5.
Figure 7:
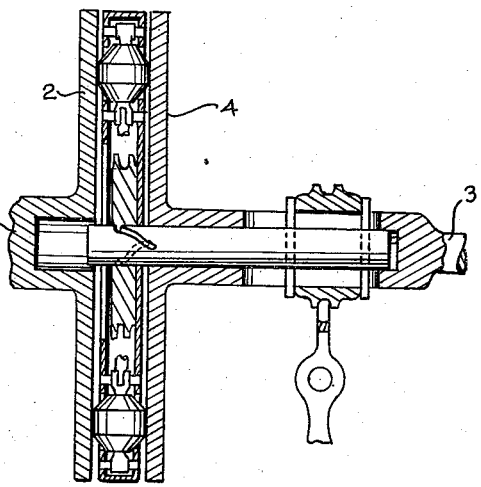
Figure 7 is a longitudinal half section taken from 7—7 on Figure 8.
Figure 8:
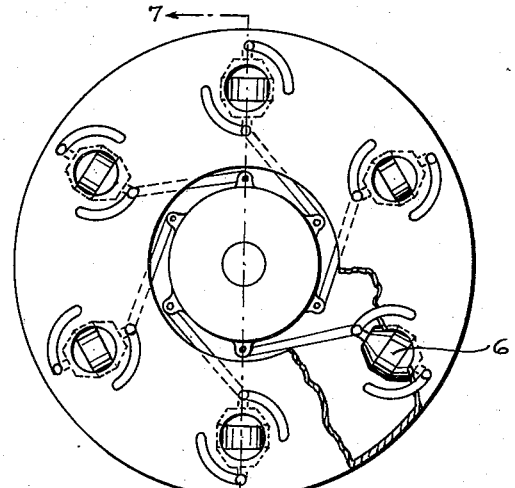
Figure 8 is an end view similar to Figure 3 except that it discloses the operative mounting for this roller type of bearing member.
Figure 9:
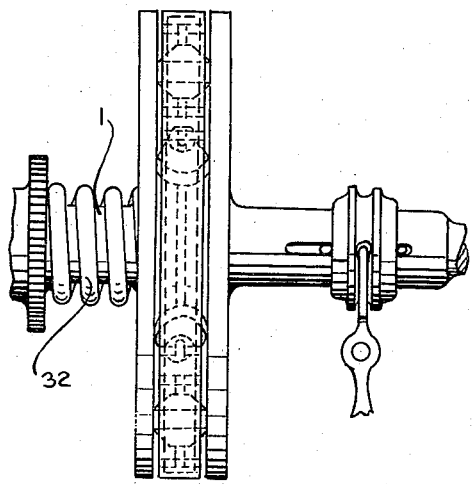
Figure 9 is a side view of the roller type power transmitting bearing assembly similar to Figure 4.
Figure 10:
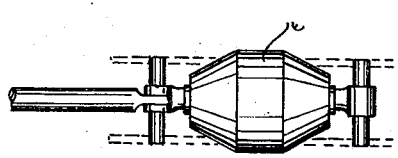
Figure 10 is a detail similar to Figure 5 but illustrating one of the roller type power transmitting bearing members.

Between the adjacent faces of plates 2 and 4 I provide a series of power transmitting ball bearings 5 (see Figure 5) or roller bearing 6 (see Fig. 10) either of which forms a power transmitting bearing operating within the scope of my invention. For the sake of explanation however I shall point out the operating features of my invention under the description of the ball type of power transmitting bearings in more detail.

Ball members 5 arranged in circumferential alignment (see Fig. 1) about a path 7 are rotatably supported each upon a spindle member 8 having a suitable adjustable anchorage in a housing or casing 9 so as to give the several bearing members a suitable operating stability for their adjustment and control.

For instance, in order to hold spindles 8 in selected positions of adjustment a pair of pin members 10 and 11 secured to spindles 8 may be provided as guide members operating respectively in their arcuate adjustment within arcuate slots 12 and 13.

A central control plate 14 is provided with a series of connecting members 15; and a like number of connecting pins 16 establish a control connection between plate 14 supported on rod 17 where they pivotally attach to connecting members 15 and spindles 8 supporting each of ball members 5 respectively.

Thus when an adjustment is made in plate 14 about rod 17 this adjustment will tend through its operative connections with the several spindles 8 to cause a change in the direction of rotation of all the power transmitting bearing members 5 or 6.

It will therefore be observed that when in normal operation as a feature of my invention where balls 5 or roller 6 establish contact between power plates 2 and 4 that so long as spindles 8 are radially disposed from center 18 which is the axis about which they revolve there will be no power transmitted from driving shaft 1 to driven shaft 3 and this series of rotating ball members 5 or roller members 6 would thus rotate freely.

However, when a slight adjustment is made in the relative position of the central control plate 14 about its supporting and control rod 17 the effect will be to thus change to that extent the direction in which the bearing members rotate. If for instance, plate 14 should be slightly moved in the direction indicated by the arrow thereon (see Figure 1) while ball members 5 are revolving in the direction indicated by the other arrow on Figure 1 this movement would shift spindles 8 about a central right angular axis 19 through which the bearing contact is made between power plates 2 and 4. This shifting of spindles 8 will result in a tendency for ball members 5 or roller member 6 to want to leave their path 7 of revolution and try to turn toward the inside of that path (see adjustment in dotted lines Figure 1). This tendency for the bearing members to "toe" in when their supporting spindle is turned causes an increase of friction between power plates 2 and 4. Thus the extent to which spindles 8 are turned from their radial alignment with center 18 the greater will be the friction contact between plates 2 and 4 through these bearing members until at the extreme limit of their adjustment the spindles 8 may be turned around to a position which is at right angles to the position shown in Figure 1 and while in this position the bearing members will not rotate together at the same speed.

It will therefore be observed that by thus adjusting all of the spindles 8 simultaneously in the same relative direction in their support of the rotating and revolving bearing members 5 or 6 there will be a corresponding development of friction between power plates 2 and 4 through the contacting bearing members due to the fact that the bearing members are not rotating exactly in circumferential alignment with their path 7 of revolution. Thus a greater amount of friction will be developed between power plates 2 and 4 through the bearing members as the angle of rotating direction of the bearing members with path 7 increases causing the bearing members not to run true in the direction of path 7; until the maximum friction is attained at the angle of adjustment for spindles 8 which will cause the bearing members to completely stop rotating permitting the power from the driving shaft 1 thus to be carried over to driven shaft 3 through power plates 2, bearing members 5 or 6 and to power plate 4.

As a further important feature of my invention I have provided a control rod 17 which may be slidably mounted either in drive shaft 1 or driven shaft 3; but for the sake of explanation in this case I have shown rod 17 to be operatively housed within driven shaft 3 within a tubular barrel 20 therein and for the normal operation of rod 17 it would be found best to provide a recess 21 in driving shaft 1.

Rod 17 normally rotates with shaft 3, for instance, since it is anchored to thus rotate by pins 22 and 23; but these two pins which are secured to rod 17 may longitudinally slide with rod 17 within barrel 20 of shaft 3. Thus when control lever 24 is shifted to one direction or the other then sleeve 25 having an annular central groove 26 is caused to slide upon shaft 3 as it is moved by the lever action of a yoke 27 thereon.

Pins 22 and 23 slide in slot 28 when adjustments are made in control lever 24 in the manipulation of control rod 17.

An integral lug member 29 of central control plate 14 slidably registers within a spiral groove 30 of control rod 17 so that whether one groove 30 is used alone or a second groove 31 (see Fig. 1) may be provided in rod 17. The result of adjusting control rod 17 slidably lengthwise by moving the lever 24 will be to shift the position of control plate 14 upon control rod 17 in which case the extent to which plate 14 may be adjusted will determine the extent to which spindles 8 will be shifted causing a corresponding shift in the direction of rotation or the angle of rotation with respect to the annular path 7 upon which the bearing members are circumferentially aligned.

It will be observed that a spring 32 provided as a means of selectively controlling the amount of spring pressure which may exist between driving plate 2 and driven plate 4, is adjustably secured to a housing 33 about shaft 1, while any one of numerous adjusting means may be provided for increasing or diminishing the tension of spring 32 at the will of the operator.

It is conceivable that within the scope of my invention that my power transmission may be adaptable to any one of a number of mechanical uses while the form of my invention as illustrated in the drawings is thus shown in its simplest possible construction to illustrate the broad scope of my invention in a manner that will be easily understood.

To the experienced engineers it will be evident that details of construction in my invention may thus be changed to permit the principle of its operation to be operatively connected up in its several adaptations and still stay within the scope of my invention.

There are, however, certain modifications in details of mechanical construction which will utilize the broad scope of this invention but which will possess specific features of construction defining other mechanical species and in such cases I am seeking patent protection through additional and more specific claims in other patent applications.

Having thus described my invention what I claim is:

1. A power transmission comprising in combination a driving member and a driven member each provided with a power plate member, and a plurality of circumferentially aligned power transmitting bearing members adjustably and rotatably operating between said plates; said power bearings each provided with an adjustable axis for its rotation thereon, and means for simultaneously adjusting all of said axes, for varying the amount of friction between said power bearings and said power plates and thus varying the amount of power transmitted from the driving to the driven member.

2. A power transmission comprising in combination, a driving plate, and a driven plate spaced from and operatively connected therewith, a plurality of power transmitting rotary bearings mounted between said plates in circumferential alignment, a spindle for each bearing and means for optionally and simultaneously adjusting said spindles with said bearing members for varying the friction contact between said plates and thus varying the amount of power transmitted from the driving to the driven plate, and an adjustable spring for varying pressure between said driving and driven plates.

3. As a new article of manufacture a power transmission comprising a driving shaft and a driven shaft each having a rotary power plate, a casing between said plates; a plurality of power transmitting ball bearings rotatably housed within said casing for contact with said plates through holes in the casing and spaced in circumferential alignment therein, a spindle member for each of said power bearing members, oppositely disposed co-operating supporting slots in said casing about said bearing holes therein for the adjustable support of each of said spindle members, a central adjusting plate for the adjustment of said spindles and each provided with a spindle control attachment, connecting pins establishing pivotal control connection between said control plate and said spindles respectively, a slidable control rod adjustably mounted within one of said shafts, one or more spiral grooves in the side adjacent the end of said rod by the central adjusting plate, and means on said adjusting plate establishing slidable adjusting connection between said adjusting plate and said spiral grooves of the rod, an adjusting collar on the shaft housing said slidable rod, retaining pins for holding said rod in rotatable relation with the shaft in which it is slidably mounted and for holding said collar rotatably free, yet in longitudinally fixed relation with said rod, and an adjusting lever engaging said collar for the selective adjustment of said rod in the control of the relative operating position of said spindle members of said power transmitting ball bearing members.

4. As a new article of manufacture a power transmission comprising a driving shaft and a driven shaft each having a rotary power plate, a casing between said plates, a plurality of power transmitting roller bearings rotatably housed within said casing for power contact with said plates through holes provided in the casing and spaced in circumferential alignment therein, a spindle member for each of said power bearing members, oppositely disposed co-operating supporting slots in said casing about said bearing holes therein for the adjustable support of each of said spindle members, a central adjusting plate for the adjustment of said spindles and each provided with a spindle control attachment, connecting pins establishing pivotal shifting control connection between said control plate and said spindles respectively, a slidable control rod adjustably mounted within one of said shafts, one or more spiral grooves in the side adjacent one end of said rod and means connected with said adjusting plate for establishing slidable spiral adjusting connection between said adjusting plate and said spiral grooves, an adjusting collar on the shaft housing said rod, retaining pins for holding said rod in rotatable relation with the shaft in which it is slidably mounted and for holding said collar rotatably free, yet in longitudinally fixed relation with said rod, and an adjusting lever engaging said collar for the selective adjustment of said rod in the control of the relative operating position of said spindle members of said power transmitting roller bearing members.

5. As a new article of manufacture a power transmission comprising a driving shaft and a driven shaft each having a rotary power plate, a casing between said plates; a plurality of power transmitting bearings rotatably housed within said casing for contact with said plates through holes in the casing and spaced in circumferential alignment therein, a spindle member for each of said power bearing members, oppositely disposed co-operating supporting slots in said casing about said bearing holes therein for the adjustable support of each of said spindle members, a central adjusting plate for the adjustment of said spindles and each provided with a spindle control attachment, connecting pins establishing pivotal control connection between said control plate and said spindles respectively, a slidable rod adjustably mounted within one of said shafts, one or more spiral grooves in the side adjacent the end of said rod and means connected with said adjusting plate for establishing slidable adjusting connection between said adjusting plate and said spiral grooves, an adjusting collar on one of said shafts, retaining pins for holding said rod in rotatable relation with the shaft in which it is slidably mounted and for holding said collar rotatably free, yet in longitudinally fixed relation with said rod, and an adjusting lever engaging said collar for the selective adjustment of said rod in the control of the relative operating position of said spindle members of said power transmitting bearing members.

LYNN D. SEARCY.